United States Patent [19]

Matsuba et al.

[11] 4,101,273
[45] Jul. 18, 1978

[54] DISPERSE DYEING WITH POLYGLYCERINE ANIONIC EMULSIFIERS AND/OR POLYARYL POLYGLYCOL ETHERS

[75] Inventors: Takafumi Matsuba, Sakai; Ryozo Kuriyama, Ibaraki; Shin-Ichi Saitoh, Takarazuka; Yoshio Ishitsuka, Minoo, all of Japan

[73] Assignee: Sumitomo Chemical Company, Limited, Japan

[21] Appl. No.: 590,947

[22] Filed: Jun. 27, 1975

[30] Foreign Application Priority Data

Oct. 24, 1974 [JP] Japan .................................. 49 123245

[51] Int. Cl.² ............................................. D06P 1/607
[52] U.S. Cl. ....................................... 8/172 R; 8/173; 8/62
[58] Field of Search ..................... 8/171, 172, 173, 179

[56] References Cited

U.S. PATENT DOCUMENTS

| | | | |
|---|---|---|---|
| 2,310,074 | 2/1943 | Cotte | 8/90 |
| 2,901,311 | 8/1959 | Nusslein | 8/62 |
| 3,153,563 | 10/1964 | Warner | 8/173 |
| 3,211,514 | 10/1965 | Casty | 8/93 |
| 3,236,583 | 2/1966 | Hos | 8/173 |
| 3,560,135 | 2/1971 | Tamada et al. | 8/171 |
| 3,706,525 | 12/1972 | Blackwell et al. | 8/21 C |
| 3,877,870 | 4/1975 | Delian | 8/173 |

FOREIGN PATENT DOCUMENTS

1,103,146  2/1968  United Kingdom ...................... 8/93

*Primary Examiner*—Donald Levy
*Attorney, Agent, or Firm*—Wenderoth, Lind & Ponack

[57] ABSTRACT

A synthetic fiber material is continuously dyed or printed by contacting with a dye bath comprising a water-insoluble dye and at least one member of polyoxyethylene derivatives, such as

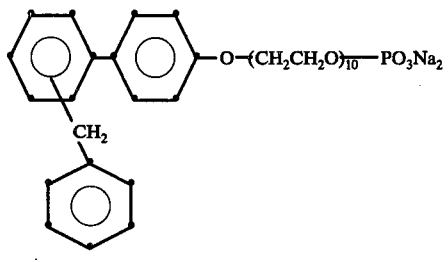

and glycerin derivatives, such as

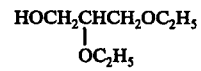

and subjecting the resulting fiber material to a dry or wet heat treatment, whereby the fiber material is dyed or printed with a deep color and with prevention of migration of the dye.

13 Claims, No Drawings

DISPERSE DYEING WITH POLYGLYCERINE ANIONIC EMULSIFIERS AND/OR POLYARYL POLYGLYCOL ETHERS

The present invention relates to a method for dyeing or printing synthetic fiber materials with a deep color. More particularly, the invention relates to a method for continuously dyeing or printing synthetic fiber materails by contacting the fiber materials with a dye bath comprising a water-insoluble dye and an auxiliary, and subjecting the resulting fiber materials to a dry or wet heat treatment.

So far, synthetic fibers, particularly polyester fibers, have been dyed by a batch system method such as high temperature dyeing, carrier dyeing and high-pressure steam dyeing, to promote diffusion of a dye into the fiber and to obtain a satisfactory dyeing.

On the other hand, a method for continuously dyeing the fiber materials has earnestly been desired to be applied for various kinds of fiber materials because of merits such as the reduction of dyeing hours, labor and water, and a large production of uniformly dyed products, but according to a continuous dyeing method, remarkable migration of dye onto the surface of the fibers occurs inevitably during the heat-treatments after padding depending upon the kind of fibers or the shape of fiber products. As far as commercially available sodium alginate, copolymers of vinyl acetate and maleic anhydride and synthetic acryl thickener are used as a migration-inhibitor, the migration of dye can hardly be prevented, resulting in such defects as uneven dyeing, surface-unevenness and insufficient penetration.

According to the continuous dyeing method disclosed by H. Leube and P. Richter in Textile Chemist and Colorist, Vol. 5, No. 3, 1973, p. 29 - 33, polyester fiber materials can be dyed by padding the fiber materials with a padding bath comprising x g/l. of Palanil dye (a disperse dye produced by BASF A.G.), 6 - 8 g/l. of Uniperol EL (a nonionic surfactant produced by BASF A.G.), 3 - 4 g/l. of Palanil Carrier AN (a carrier produced by BASF A.G.), 3 - 4 g/l. of ethyleneglycol monophenylether and 25 g/l. of primasol AM (thickener produced by BASF A.G.), drying the resulting materials and subjecting them to a high-temperature steaming, but the method is not sufficient in prevention of the migration and inferior in color value to a dip dyeing method. Thus, a method of continuous dyeing for a certain kind of fiber materials, for example, woven fabric of textured polyester and knit fabric of polyester blend has not yet been put into practice.

In the field of piece dyeing, however, as a method more rational and suitable for dyeing and finishing a large amount of the fibers, compared with the above-said batch sysem method, a continuous heat fixing method, which is so-called pad-thermosol dyeing method, has been promoted. According to the pad-thermosol dyeing method, however, the dyeings with a sufficiently deep color can hardly be obtained, because the amount of dye put on the fiber during the padding process is limited and the temperature and time of the heat-fixing process are limited to some extent. Although dyeings with a relatively deep color can be obtained by increasing the amount of dye put on the fiber, or by rising or prolonging the temperature and time respectively of the fixing process, the resulting dyeings are inferior in evenness and rough and hard in a hand touch. This is the largest defect in the said pad-thermosol dyeing method. Also in a printing, a relatively large amount of the dye can be put on the fiber, but it is difficult to obtain dyeings with a satisfactorily deep color as far as the continuous heat-fixing method is applied. Therefore, various attempts have been made from view point of a dyeing apparatus, but are not suffessful in solving the above-said problems.

While, in a conventional printing of the synthetic fiber materials, particularly polyester fiber materials, various after-treatments for example, water-rinsing, reduction cleaning, further water-rinsing and then hot-water-rinsing, and the like have been required to remove various kinds of dyeing auxiliaries, unfixed dye and pastes after the dyeing has been completed, thereby to obtain dyeings with a soft hand touch and high fastnesses. Accordingly, the conventional printing method has such defects that not only a large amount of water and labor are inevitably required, but also the fiber structure is deformed, and particularly in the printing, the deformation of fiber structure results in deformation of the printed pattern, and moreover bleeding of the unfixed dye occurs during the washing processes to stain a non-printed white part, so that a pattern having a good sharpness can hardly be obtained. Recently, a method for obtaining dyeings without the washing processes has been developed to improve the above-said defects, and a method using a pigment resin color and a transfer printing method are well known. There are, however, various problems in the methods. For example, the method using a pigment resin color has such defects that the printed products are markedly hard in hand touch and inferior in fastnesses to washing and rubbing, and the transfer printing method has such defects that it is expensive because of additional costs of paper, and a white marking occurs when stretched because of insufficient penetration during the sublimation of dye when a thick knit products are used to be colored.

One object of the present invention is to provide a method for continuously dyeing synthetic fiber materials with prevention of migration of a water-insoluble dye onto the surface of synthetic fiber materials during heat treatment processes after padding.

Another object of the invention is to provide a method for continuously dyeing or printing synthetic fiber materials with a deep color.

Other object of the invention is to provide a method for printing synthetic fiber materials with a soft hand touch and high fastnesses without after-treatments such as washing.

In order to accomplish the first object of the present invention, the inventors have earnestly studied on prevention of migration of a water-insoluble dye during heat treatment processes such as drying and dye-fixing processes, and have found that it is favorable to adhere or fix a certain amount of the dye uniformly on the fiber materials within an evaporation temperature of free water, at which the migration takes place, in addition to control of hydration degree and viscosity of a padding bath which have heretofore controlled by using a thickener, and that a high boiling sulfuric ester or phosphoric ester salt of a polyoxyethylene derivative having the formula (I) mentioned below can almost completely prevent migration of the dye onto the surface of fiber materials without use of a carrier in the continuous dyeing of hydrophobic fibers or union products thereof, and moreover can markedly promote penetration and diffusion of the dye into the fibers, resulting in increase of an apparent color value.

Further, in order to accomplish the second object of the invention, the present inventors have studied on a method for dyeing and printing synthetic fiber materials with lowering the heat treatment temperature in a conventional continuous heat fixing method to effectively fix the dye given on the fibers according to a padding or printing method, resulting in substantial increase of the apparent color value or to improve the hand touch of the dyeings, resulting in production of dyeings having a deep color comparable with that of a conventional dip dyeing method, and have found that a dyeing bath, i.e., padding liquid or a printing paste comprising a glycerin derivative of the formula (II) mentioned below, and if necessary auxiliaries can give dyeings markedly increased in a color value without harm of the hand touch of fibers even under such conditions as in the conventional padding or printing method.

Furthermore, in order to accomplish the third object of the invention, the present inventors have studied to improve the above-mentioned defects of a method using a pigment resin color or a transfer printing method which has such merit as requiring no after-treatments such as washing processes, and have found that the polyoxyethylene derivative of the formula (I) or a mixture thereof with the glycerin derivative of the formula (II) can effectively act for solubilizing dispersion, penetration and fixability of the dye and for increase of the surface color value, improvement on back coloring and softening of hand touch, resulting in production of dyeings with an excellent fastness and a soft hand touch, even if the after-treatments such as washing after fixing the dye are omitted.

Thus, the present invention provides a method for dyeing or printing synthetic fiber materials, which comprises (1) contact the fiber materials with a dye bath comprising a water-insoluble dye and at least one member selected from the group consisting of polyoxyethylene derivative of the formula (I), and glycerin derivatives of the formula (II), the formula (I) being represented by

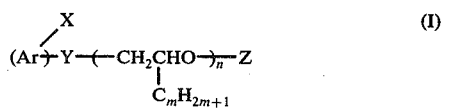

wherein Ar is a benzene or naphthalene nucleus which may be substituted with at least one halogen atom, hydroxy group, sulfonic acid salt group or alkyl, alkoxy, aryl, aryloxy, aralkyl, alkaryl or cycloalkyl group which may be substituted with a nonionic group; Y is —C—, —COO— or —CH$_2$O—; $m$ is a numeral 0 or 1; $n$ is an integer of 1 to 30; Z is a residue of water soluble salt of phosphoric or sulfuric ester; and X is a hydrogen atom, —OCOR$^1$,

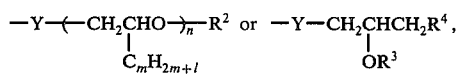

in which Y, $m$ and $n$ are as defined above, R$^1$ is an alkyl group or a haloalkyl group, R$^2$ is a hydrogen atom, an alkyl, aralkyl or aryl group which may be substituted with a nonionic group, or R$^2$ is —COR$^1$, in which R$^1$ is as defined above, a residue of water-soluble salt of phosphoric or sulfuric ester, or

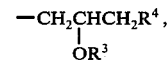

R$^3$ is an alkyl group, a haloalkyl group or —COR$^1$, in which R$^1$ is as defined above, and R$^4$ is a halogen atom or —OR$^3$, in which R$^3$ use as defined above; and the formula (II) being

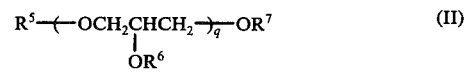

wherein R$^5$ is a hydrogen atom, an alkyl group, a nonionic group-substituted alkyl group, —COR$^1$, (Ar—Q—,

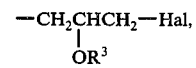

in which Ar, R$^1$ and R$^3$ are as defined above, Q is a direct linkage, —CH$_2$— or —CO—, and Hal is a halogen atom, or a residue of water-soluble salt of phosphoric or sulfuric ester; and R$^6$ and R$^7$ are individually a hydrogen atom, an alkyl group, a haloalkyl group, an aryl group, a halogen-, hydroxy- or alkyl-substituted aryl or —COR$^1$, in which R$^1$ is as defined above; and $q$ is an integer of 1 to 6; and (2) subjecting the resulting fiber material to a dry and/or wet heat fixing treatment, and also provides a liquid dye composition comprising a water-insoluble dye, at least one member selected from the polyoxyethylene derivatives of the formual (I) and the glycerin derivatives of the formula (II) and at least one conventional auxiliary.

More particularly, the invention provides (1) a method for preventing migration of a water-insoluble dye in a continuous dyeing of synthetic fiber materials, which comprises contacting the fiber materials with a padding bath comprising the water-insoluble dye and the polyoxyethylene derivative of the formula (I); (2) a method for continuously dyeing or printing synthetic fiber materials with a deep color, which comprises contacting the fiber materials with a padding bath or printing paste comprising a water-insoluble dye and at least one glycerin derivative of the formula (II); and (3) a method for printing synthetic fiber materials without any treatment after a heat fixing treatment, which comprises contacting the fiber materials with a printing paste comprising a water-insoluble dye, the polyoxyethylene derivative of the formula (I), the glycerin derivative of the formula (II), and a water-soluble thickener.

In the present specification, the term "alkyl" means an alkyl having 1 to 20 carbon atoms, provided that the term "alkyl" in R$^5$, R$^6$ and R$^7$ in the formula (II) means an alkyl having 1 to 4 carbon atoms, the term "aryl" means phenyl or naphthyl, the term "halogen" favorably means chlorine or bromine. The favorable substituents of the benzene nucleus represented by Ar in the formula (I) include aryl, aryloxy, aralkyl which alkyl portion has 1 to 3 carbon atoms, and cycloalkyl having 5 or 6 carbon atoms, the aryl being phenyl group unsubstituted or substituted by a halogen atom or a hydroxy, sulfonic acid salt, alkyl, alkoxy or aralkyl group which alkyl portion has 1 to 3 carbon atoms.

The water-insoluble dye used in the present invention includes conventional disperse dyes, vat dyes and oil-soluble dyes.

Preferred embodiments of the polyoxyethylene derivatives represented by the formula (I) are as follows.

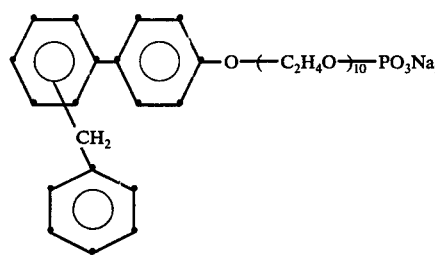
(I-1)

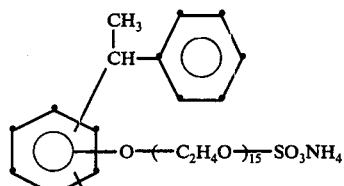
(I-2)

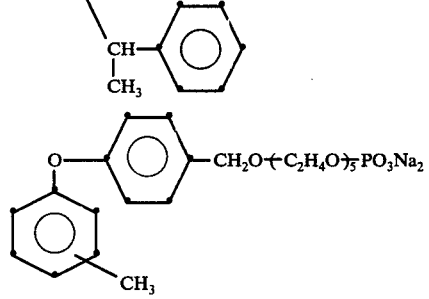
(I-3)

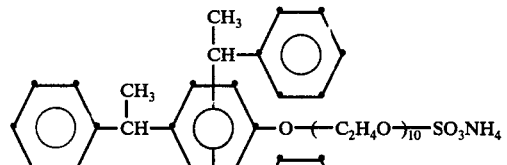
(I-4)

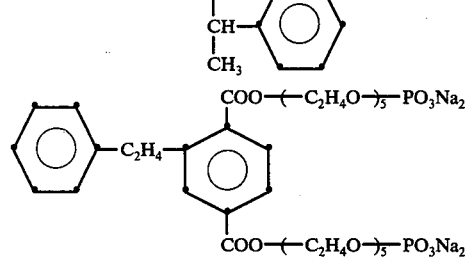
(I-5)

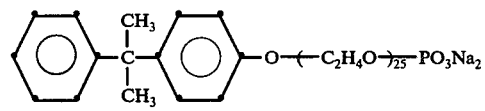
(I-6)

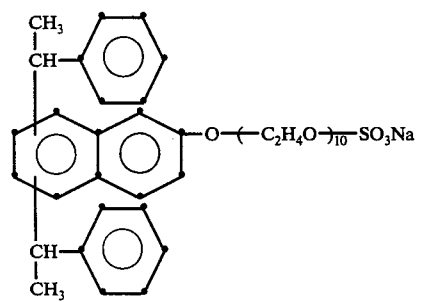
(I-7)

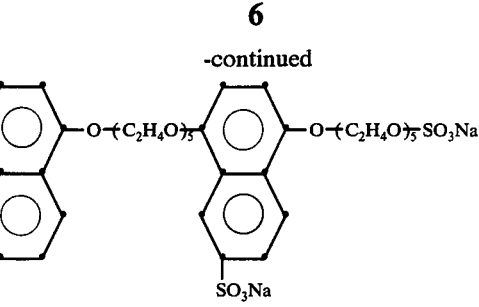
(I-8)

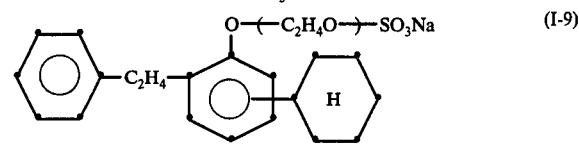
(I-9)

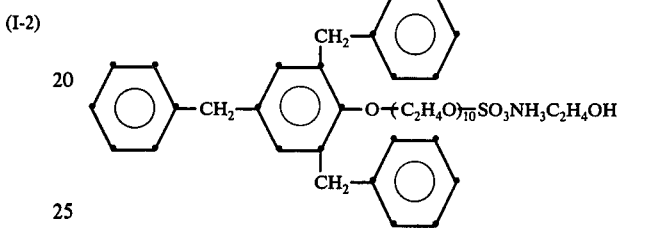
(I-10)

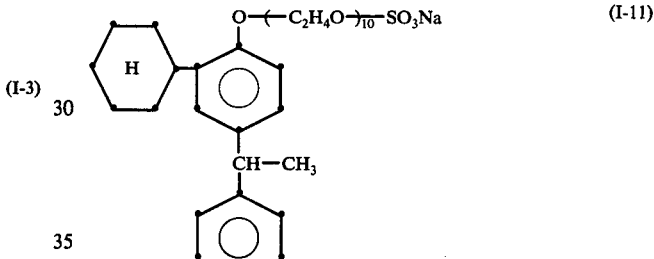
(I-11)

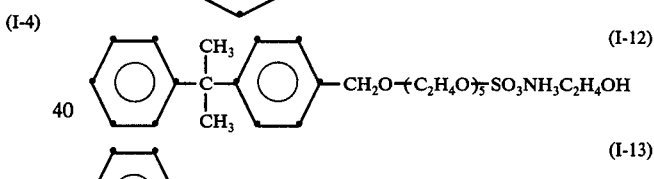
(I-12)

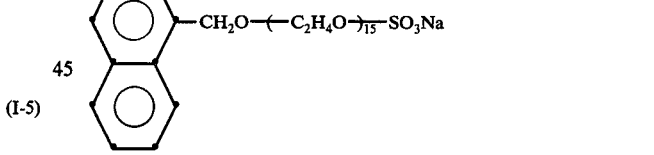
(I-13)

The polyoxyethylene derivative of the formula (I) can easily be obtained by reacting an aromatic compound substituted directly or through a bivalent group with hydroxy group or carboxyl group (e.g. benzyl-p-phenylphenol, acetylsalicylic acid and the like), with an alkylene oxide or a polyalkylene glycol in the presence or absence of a catalyst, and reacting the resulting intermediate compound with oxyphosphorus chloride or sulfuric acid to obtain the corresponding ester, which is then neutralized with an alkali.

The water-soluble salts of the polyoxyethylene derivatives include alkali metal salts such as sodium and potassium salts, ammonium salts and organic amine salts such as monoethanolamine, diethanolamine, triethanolamine, methylamine, ethylamine and butylamine salts.

Preferred embodiments of the glycerin derivatives of the formula (II) are as follows.

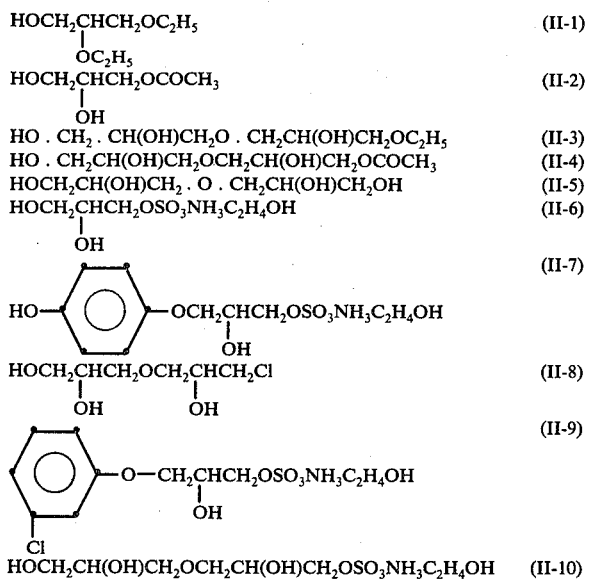

(II-1) HOCH₂CHCH₂OC₂H₅
          |
          OC₂H₅

(II-2) HOCH₂CHCH₂OCOCH₃
          |
          OH (II-3) HO.CH₂.CH(OH)CH₂O.CH₂CH(OH)CH₂OC₂H₅

(II-4) HO.CH₂CH(OH)CH₂OCH₂CH(OH)CH₂OCOCH₃

(II-5) HOCH₂CH(OH)CH₂.O.CH₂CH(OH)CH₂OH (II-6) HOCH₂CHCH₂OSO₃NH₃C₂H₄OH
          |
          OH (II-7) HO—⟨○⟩—OCH₂CHCH₂OSO₃NH₃C₂H₄OH
                    |
                    OH (II-8) HOCH₂CHCH₂OCH₂CHCH₂Cl
          |        |
          OH       OH (II-9) ⟨○⟩—O—CH₂CHCH₂OSO₃NH₃C₂H₄OH
        |         |
        Cl        OH (II-10) HOCH₂CH(OH)CH₂OCH₂CH(OH)CH₂OSO₃NH₃C₂H₄OH

The glycerin derivatives of the formula (II) can also easily be obtained by reacting glycerin with an alkylating agent (e.g. alkyl halides or epoxy compounds) or by esterifying glycerin or a derivative thereof with organic or inorganic acids, and if necessary neutralizing the resulting compound.

The glycerin derivatives (II) can be used each alone or in a mixture thereof.

The synthetic fiber materials to be colored according to the method of the present invention are those which can be dyed or printed with the above-said water-insoluble dyes, for example, polyester fibers, triacetate fibers, polyamide fibers, polyacrylic fibers, polypropylene fibers, polyvinyl chloride fibers and modified fibers thereof. The above-mentioned fibers may be blended with each other and furthermore with cellulosic fibers.

The method for dyeing or printing the synthetic fiber materials according to the present invention are illustrated in great detail as follows.

In carrying out the method for preventing migration of the dye, a padding bath can be prepared by adding the polyoxyethylene derivative (I) to an aqueous dispersion of the water-insoluble dye, and if desired, adding a conventional thickener thereto. The fiber materials are then padded through the bath, and squeezed to uniform. After pre-drying uniformly at a temperature of 70° C. to 140° C. using a hot-air dryer, an inflared ray dryer or the like or without the pre-drying, the materials are subjected to heat-fixing treatment for 10 seconds to 10 minutes by means of a thermosol machine or a high temperature steaming maching (hereinafter referred to as HT steamer) controlled to a temperature of 130° C. to 220° C., or by means of a continuous high-pressure steamer. The resulting materials can, if desired, be after-treated including reduction clearing.

The amount of the polyoxyethylene (I) may be optional, preferably 0.1 to 10 parts by weight, more preferably 0.5 to 2 parts by weight, based on 100 parts by weight of the padding bath. If desired, other auxiliaries such as penetrants (e.g. sulfosuccinic acid derivatives), and oxidizing agents (e.g. sodium m-nitrobenzene sulfonate, sodium chlorate) may be used optionally together with a conventional carrier (e.g. methylnaphthalene, o-phenylphenol). The total amount of the auxiliaries and carriers is preferably 0.05 to 5.0 parts by weight based on 100 parts by weight of the padding bath.

Examples of the thickener used optionally in the present invention includes sodium alginate, esterified sodium alginate, copolymers of vinyl acetate and maleic anhydride, acrylic compounds, polyvinyl alcohols, carboxymethyl cellulosic compounds and others usually used in a conventional padding process. The amount thereof may be optional depending upon the purpose, preferably 0.05 to 5 parts by weight based on 100 parts by weight of the padding bath.

In carrying out the method for continuously obtaining dyeings with a deep color, a padding bath or a printing paste can be prepared by mixing the water-insoluble dye and at least one of the glycerin derivatives (II) with the above-said thickener in water, and if desired, further adding the above-said auxiliaries, carriers, or organic acids or ammonium salts thereof. The synthetic fiber materials are treated with the resulting padding bath or printing paste according to a conventional padding or printing method, and then subjected to the above-mentioned heat-fixing treatment after or without the pre-drying, and if necessary further subjected to the above-mentioned after-treatments.

The amount of the glycerin derivative (II) may be at least 0.1 part by weight, preferably 0.1 to 10 parts by weight, more preferably 0.5 to 2 parts by weight, based on 100 parts by weight of the padding bath or printing paste. When the materials to be dyed are woven fabrics, particularly of the textured, which are required to be heat-fixed at a relatively low temperature, e.g. about 170° C., increase of the amount of the glycerin derivative (II) gives favorable results in the fixation of dye, hand touch and fastnesses.

The auxiliaries, carriers or organic acids or ammonium salts thereof which are optionally used in the present invention, are favorably used to increase the fixation of dye when a disperse dye containing a large amount of dispersants is used, and favorably used to prevent discoloration which occurs due to the kind of the water-insoluble dye. Examples of the organic acids include tartaric acid, phthalic acid, cresotinic acid, salicylic acid, benzoic acid, methylsuccinic acid and ethylsuccinic acid. The amount of the auxiliaries, carriers, or the organic acids or ammonium salts thereof is below 10 parts by weight, preferably 0.05 to 5 parts by weight based on 100 parts by weight of the padding bath or printing paste.

The amount of the thickeners may be optional depending upon the processing methods, preferably 0.05 to 5 parts by weight in case of the pad-dyeing, and 1 to 20 parts by weight in case of the printing, based on 100 parts by weight of the padding bath or printing paste respectively.

Further, in carrying out the method for obtaining a printed fiber material with a soft hand touch and good fastnesses without after-treatments such as washing, the water-insoluble dye, for example, a disperse dye cake, is sufficiently dispersed in water in the presence of the polyoxyethylene derivative (I) by mechanical means. Successively, the resulting dispersion is added to a solution prepared in advance by mixing the glycerin derivative (II) and a water-soluble thickener optionally together with a silicone or alcohol defoaming agent, and metal-sequestering agent, an oxidizing agent and/or textile finishing resins, and the resulting mixture is well stirred to obtain a homogeneous printing paste. The synthetic fiber material is uniformly printed with the resulting printing paste by means of a printing roller, engraved rollers such as a photogravure roller, a rotary screen or a screen printing machine, or mangle in case of a plain dyeing, and then pre-dried by means of a hot-air dryers, an inflared ray dryer, cylinder dryer and the like, which are controlled at a temperature of 80° C. to 120° C. The pre-dried material is then subjected to a dry heat treatment at a temperature of 160° C. to 220° C. for 30 to 180 seconds, or a fixing treatment in a superheated steam of 150° C. to 190° C. for 1 to 10 minutes. Alternatively it is heat-treated in a high pressure steam of 120° C. to 160° C. for 1 to 40 minutes. If desired, a combination of the above-said heat fixing treatments can be applied. Thus, the printed material with a soft hand touch and good fastnesses can be obtained without after-treatments such as washing.

The amounts of the polyoxyethylene derivative (I) and the glycerin derivative (II) may be optional depending upon the purpose, preferably 0.01 to 10 parts by weight, more preferably 0.1 to 2 parts by weight, and preferably 1 to 70 parts by weight, more preferably 3 to 30 parts by weight, respectively, based on 100 parts by weight of the printing paste.

Examples of the water-soluble thickener includes carboxymethyl cellulose, hydroxyethyl cellulose, methyl cellulose, water-soluble polyacrylamide resins, polyvinyl alcohol resins, and acrylates and copolymers thereof. The amount thereof may be optional, preferably 1 to 20 parts by weight based on 100 parts by weight of the printing paste.

Also in this method, a textile finishing resin and a catalyst therefor can be used to improve a water-fastness. Examples of the textile finishing agent include melamine resins, glyoxal resins, uron resins, water-soluble polyurethane resins, polyacrylic ester emulsion resins, silicone resins and ethylene-vinyl acetate resins.

In the preparation of the liquid dye composition, the polyoxyethylene derivative (I) and/or the glycerin derivative (II) is added to an aqueous dispersion of the water-insoluble dye, and the mixture is well mixed to obtain a homogeneous dye composition. A water-insoluble dye cake can be dispersed in water by grinding with mechanical means, e.g. a ball mill, colloid mill and the like, in the presence of the polyoxyethylene derivative (I). According to the utilities of the dye composition, the auxiliaries, carriers, organic acids or ammonium salts thereof, thickeners and/or water-soluble thickeners can further be added thereto.

The amount of the water-insoluble dye is 5 to 40 parts by weight, the polyoxyethylene derivative (I) 1 to 30 parts by weight, and the glycerin derivative 1 to 90 parts by weight, respectively, based on 100 parts by weight of the liquid dye composition, provided that the total amount of the polyoxyethylene derivative and the glycerin derivative is up to 60 parts by weight when they are used simultaneously.

The present invention is explained in more detail with reference to the following Examples, which are only illustrative, and not intended to limit the scope of the present invention. In Examples, parts, percentages and ratios are by weight, and the parenthesized number of compounds corresponds to that of the polyoxyethylene derivative (I) and the glycerin derivative (II) described in the specifications.

EXAMPLE 1

A mixture of 15 parts of Sumikaron Rubin SE-GL cake (a trademark of Sumitomo Chemical Company Limited, C.I. Disperse Red 73), 10 parts of the compound (I-9) and 65 parts of water was peptized in a ball mill for 50 hours. Successively, 10 parts of the compound (I-10) was added thereto to prepare 100 parts of a dye composition.

A mixture of 8 parts of the resulting dye composition, 89.9 parts of water, 1.0 part of 10% aqueous solution of sodium alginate and 0.1 part of Foamless SO (a defoaming agent, produced by Meisei Chemical Co., Ltd.) was gently stirred to obtain 100 parts of a padding bath.

A woven fabric of 100% textured polyester was uniformly padded through the above bath, and then uniformly pre-dried in a hot-air dryer of 120° C. The pre-dried fabric was dry heat-treated at 190° C. for 60 seconds using a thermosol dyeing machine, and then treated at 70° C. to 80° C. for 2 minutes in a reduction clearing bath comprising 0.2 part of 40° Be' sodium hydroxide, 99.4 parts of water, 0.2 part of hydrosulfite and 0.2 part of Laccol AL (a bethaine type of unphotic surfactant, produced by Meisei Chemical Co., Ltd.). Thus, migration of the dye onto the surface of the fabric was almost completely prevented to obtain a dark red dyeing with evenness and good fastnesses.

The similar dyeing was also obtained in case where the pre-dried fabric was treated at 155° C. for 3 minutes using a continuous high-pressure steamer in place of the thermosol dyeing machine.

EXAMPLE 2

The manner similar to that of Example 1 was repeated, provided that 20 parts of the compound (I-6) alone was used in place of the compounds (I-9 and 10), whereby the similar dyeing was obtained.

On the other hand, the pre-dried fabric was dry heat-treated at 190° C. for 30 seconds, and further treated at 140° C. for 3 minutes using a continuous high-pressure steamer, to obtain the similar dyeing.

EXAMPLE 3

The manner similar to that of Example 1 was repeated, provided that 10 parts of the compound (I-12) and 10 parts of the compound (I-3) were respectively used in place of the compounds (I-9 and 10), whereby the similar dyeing was obtained.

Further, the similar dyeing also was obtained when the pre-dried fabric was treated at 180° C. for 10 minutes using a HT steamer in place of the thermosol dyeing machine.

EXAMPLE 4

3 Parts of Sumikaron Navy Blue S-3G (a trademark of Sumitomo Chemical Company Limited, C.I. Disperse Blue 301) was homogeneously dispersed in 94 parts of water, and 3 parts of the compound (I-7) was added thereto to prepare 100 parts of a padding bath. A polyester filament fabric was padded uniformly with the padding bath and pre-dried without unevenness in a hot-air dryer of 120° C. Then the pre-dried fabric was heat-treated in a thermosol dyeing machine of 200° C. for 90 seconds. Thereafter, the fabric was treated at 70° C. to 80° C. for 2 minutes in a reduction clearing bath comprising 0.2 part of 40° Be' sodium hydroxide, 0.2 part of hydrosulfite, 0.2 part of Laccol AL (the same as used in Example 1) and 99.4 parts of water. Thus, the migration of the dye onto the surface of the fabric was almost completely prevented to obtain a navy blue dyeing with evenness and good fastnesses.

The similar dyeing was also obtained when the pre-dried fabric was heat-treated at 170° C. for 5 minutes using a HT steamer in place of the thermosol dyeing machine, an also when a conventional soaping treatment using a soapless soap and sodium carbonate was conducted in place of the reduction clearing.

EXAMPLE 5

A mixture of 20 parts of Sumikaron Yellow Brown S-2RL liquid (a trademark of Sumitomo Chemical Company Limited, C.I. Disperse Orange 30) and 80 parts of the compound (II-10) was stirred to prepare a homogeneous dye composition. Successively, 30 parts of the dye composition was mixed with a solution prepared in advance by mixing 18.1 parts of water, 40 parts of 7% aqueous solution of Sumiflock FN (an acrylamide flocculant produced by Sumitomo Chemical Company limited), 10 parts of 10% aqueous solution of PVA 217 (polyvinyl alcohol produced by Kuraray Co., Ltd.), 1 part of Sumitex Resin FSK (a glyoxal resin produced by Sumitomo Chemical Company Limited) and 0.9 part of Sumitex Accerelator ACX (a catalyst produced by Sumitomo Chemical Company Limited), to obtain 100 parts of a printing paste.

A woven fabric of 100% textured polyester was printed uniformly with the said printing paste using a printing roller having 100 to 140 μ of an engraving depth, and then pre-dried without unevenness using a pin tenter controlled to 100° C. The pre-dried fabric was thermosol-treated for 90 seconds using the pin tenter controlled to 200° C., whereby a yellowish brown printed fabric with a soft hand touch and high fastnesses was obtained without washing treatments.

EXAMPLE 6

The manner similar to that of Example 5 was repeated, provided that the compound (II-5) was used in place of the compound (II-10), whereby the similar printed fabric was obtained.

EXAMPLE 7

The manner similar to that of Example 5 was repeated, provided that 75 parts of the compound (II-3) in place of the compound (II-10), and additionally 0.1 part of Polyesca DS (a methylnaphthalene carrier, produced by Soryu Chemical Co., Ltd.) were used, whereby the similar printed fabric was obtained.

The heat-treatment at 180° C. for 10 minutes using a HT steamer in place of the thermosol dyeing machine gave also the similar printed fabric.

EXAMPLE 8

To a dispersion of 10 parts of Sumikaron Navy Blue S-3G liquid (a trademark of Sumitomo Chemical Company Limited, C.I. Disperse Blue 301) in 18 parts of water, were added 20 parts of the compound (II-4) and 2 parts of the compound (II-7) while being well stirred, and then 49.5 parts of 4% aqueous solution of sodium alginate and 0.5 part of methylsuccinic acid was added thereto, and the resulting mixture well stirred to prepare 100 parts of a printing paste.

A woven fabric of textured polyester was screen-printed with the above printing paste, pre-dried and then heat-treated for 90 seconds in a thermosol dyeing machine controlled to 200° C. The printed fabric was washed with water to obtain a navy blue printed fabric with a deep color.

EXAMPLE 9

A mixture of 10 parts of Sumikaron Brilliant Blue S-BL cake (a trademark of Sumitomo Chemical Company Limited, C.I. Disperse Blue 143), 10 parts of the compound (I-11) and 30 parts of water was dispersed for 30 hours using a ball mill and then 50 parts of the compound (I-5) was added thereto to obtain 100 parts of a dye composition. Successively, 20 parts of the above dye composition was added to a solution prepared in advance by mixing 38 parts of Sumitex Resin A-1 (a polyacrylamide resin produced by Sumitomo Chemical Company Limited), 2.0 parts of Sumitex Softener L (a nonionic softening agent produced by the same company as above), 0.4 part of Sumitex Resin M-3 (a melamin resin produced by the same company as above), 0.3 part of Sumitex Accerelator ACX (a catalyst produced by the same company as above) and 39.3 parts of water, to obtain 100 parts of a printing paste. A woven fabric of 100% textured polyester was printed uniformly with the above printing paste using a photogravure roller, pre-dried without unevenness in a hot-air dryer or a cylinder dryer, and then heat-treated at 200° C. for 90 seconds using a thermosol dyeing machine. Thus, a blue printed fabric with a soft hand touch and a clear deep color was obtained.

While, the treatment of pre-dried fabric at 180° C. for 8 minutes using a HT steamer in place of the thermosol dyeing machine gave the similar dyeings.

EXAMPLE 10

A mixture of 0.2 part of Sumikaron Blue 3RF cake (a disperse dye produced by Sumitomo Chemical Company Limited), 0.5 part of a mixture of the compounds (I-3 and I-12, the mixing ratio of 15:85) and 28.3 parts of water was dispersed in a ball mill. Successively, the resulting dispersion was mixed with a solution prepared in advance by mixing 32 parts of a mixture of the compounds (II-10 and II-4, the mixing ratio of 75:25), 2.5 parts of 10% aqueous solution of hydroxyethyl cellulose, 35 parts of a water-soluble polyacrylamide resin, 0.7 part of Sumitex Resin 800K (a uron resin produced by Sumitomo Chemical Company Limited), 0.3 part of Sumitex Accerelator ACX (a catalyst produced by the same company as above), 0.25 part of Foamless SO (a defoaming agent produced by Meisei Chemical Co., Ltd.) and 0.25 part of E.D.T.A. (ethylenediamine tetracetate, a metal sequestering agent), to obtain 100 parts of a printing paste.

A thin woven fabric of textured polyester was printed uniformly with the above printing paste using an engraved roller printing machine, and then pre-dried at 80° C. to 120° C. without unevenness in a hot-air dryer. The pre-dried fabric was wet heat-treated for 10 minutes in a HT steamer controlled to 185° C., to obtain a clear blue printed fabric with a soft hand touch and good fastnesses.

EXAMPLE 11

A mixture of 0.5 part of Sumikaron Yellow Brown S-2RL cake (a trademark of Sumitomo Chemical Company Limited, C.I. Disperse Orange 30), 0.3 part of the compounds (I-2 and I-10, the mixing ratio of 10:90) and 29.2 parts of water was dispersed in a colloid mill.

Successively, the resulting dispersion was mixed with a solution prepared in advance by mixing 20 parts of the compounds (II-5 and II-6, the mixing ratio of 85:15), 47.5 parts of 10% aqueous solution of a water-soluble polyacrylamide resin, 1 part of Sumitex Resin NS-2 (a glyoxal resin produced by Sumitomo Chemical Company Limited), 0.25 part of IP Defoamer O (an alcohol defoaming agent produced by Ipposha Oil Industries Co., Ltd.), 0.25 part of E.D.T.A. and 1 part of Sumitex Accerelator ACX (a catalyst produced by Sumitomo Chemical Company Limited), to obtain 100 parts of a printing paste.

A mixed cloth of polyester and polyamide fiber (the mixing ratio of 90:10) was printed uniformly using a rotary screen printing machine, and pre-dried without unevenness using an inflared dryer. The pre-dried cloth was dry heat-treated at 170° C. for 90 seconds in a thermosol dyeing machine and further wet heat-treated at 170° C. for 10 minutes in a HT steamer to obtain a brown printed cloth with good fastnesses.

What is claimed is:

1. A method for dyeing or printing polyester fiber materials, which comprises (1) contacting the fiber material with a dye bath comprising a water-insoluble dye and at least one member selected from the group consisting of a polyoxyethylene of formula (I), and a glycerin derivative, formula (I) being represented by

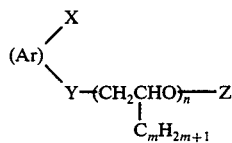   (I)

wherein Ar is a naphthalene nucleus substituted by aryl-$C_1$-$C_3$ alkyl, or a benzene nucleus substituted by at least one aryl, aryloxy, aryl-$C_1$-$C_3$ alkyl or $C_5$-$C_6$ cycloalkyl, said aryl being hydrocarbyl unsubstituted or substituted by methyl or phenyl-$C_1$-$C_3$ alkyl;

Y is —O—, —COO— or —CH$_2$O—;

m is a numeral 0 or 1;

n is an integer of 1 to 30;

Z is alkali metal sulfato or phosphato, ammonium sulfato or phosphato, or monoethanolamine-, diethanolamine-, triethanolamine-, methylamine-, ethylamine- or butylaminesulfato or phosphato salt;

and X is hydrogen or

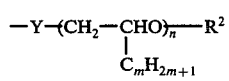

in which Y, m and n are as defined above, and $R^2$ is alkali metal sulfato or phosphato, ammonium sulfato or phosphato, or monoethanolamine-, diethanolamine-, triethanolamine-, methylamine-, ethylamine- or butylamine-sulfato or phosphato; and the glycerine derivative being a compound selected from the group consisting of HO . CH$_2$CH(OH)CH$_2$O . CH$_2$CH(OH)CH$_2$OC$_2$H$_5$
HO . CH$_2$CH(OH)CH$_2$OCH$_2$CH(OH)CH$_2$OCOCH$_3$
HOCH$_2$CH(OH)CH$_2$ . O . CH$_2$CH(OH)CH$_2$OH
HOCH$_2$CHCH$_2$OSO$_3$NH$_3$C$_2$H$_4$OH
          |
          OH

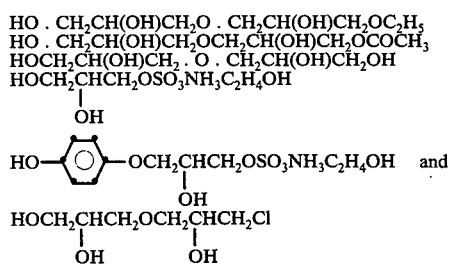
HOCH$_2$CHCH$_2$OCH$_2$CHCH$_2$Cl
          |                |
          OH              OH

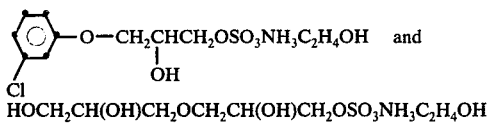
Cl
HOCH$_2$CH(OH)CH$_2$OCH$_2$CH(OH)CH$_2$OSO$_3$NH$_3$C$_2$H$_4$OH and subjecting the resulting fiber material to a dry and/or wet heat treatment.

2. A method for continuously dyeing or printing polyester fiber materials, which comprises contacting the fiber material with a padding bath or a printing paste comprising a water-insoluble dye and at least one glycerin derivative selected from the group consisting of HO . CH$_2$CH(OH)CH$_2$O . CH$_2$CH(OH)CH$_2$OC$_2$H$_5$
HO . CH$_2$CH(OH)CH$_2$OCH$_2$CH(OH)CH$_2$OCOCH$_3$
HOCH$_2$CH(OH)CH$_2$ . O . CH$_2$CH(OH)CH$_2$OH
HOCH$_2$CHCH$_2$OSO$_3$NH$_3$C$_2$H$_4$OH
          |
          OH

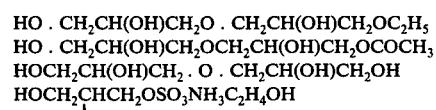

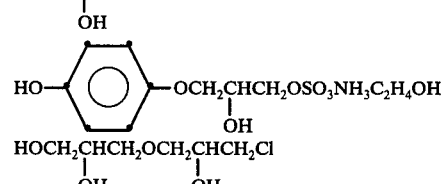
HOCH$_2$CHCH$_2$OCH$_2$CHCH$_2$Cl
          |                |
          OH              OH

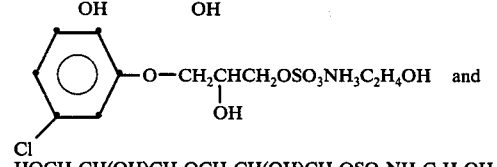
Cl
HOCH$_2$CH(OH)CH$_2$OCH$_2$CH(OH)CH$_2$OSO$_3$NH$_3$C$_2$H$_4$OH and subjecting the resulting fiber material to a dry and/or wet heat treatment.

3. A method for printing polyester fiber materials, which comprises contacting the fiber material with a printing paste comprising a water-insoluble dye, a polyoxyethylene of the formula I:

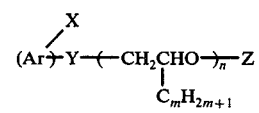   (I)

wherein Ar is a naphthalene nucleus substituted by aryl-$C_1$-$C_3$ alkyl, or a benzene nucleus substituted by at least one aryl, aryloxy, aryl-$C_1$-$C_3$ alkyl or $C_5$-$C_6$ cycloalkyl, said aryl being hydrocarbyl unsubstituted or substituted by methyl or phenyl-$C_1$-$C_3$ alkyl;

Y is -O-, -COO- or -CH$_2$O-;

m is a numeral 0 or 1;

n is an integer of 1 to 30;

Z is alkali metal sulfato or phosphato, ammonium sulfato or phosphato, or monoethanolamine-, diethanolamine-, triethanolamine-, methylamine-, ethylamine-, or butylamine-sulfato or phosphato salts;

and X is hydrogen or

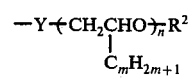

Y, m and n are as defined above, and $R^2$ is alkali metal sulfato or phosphato, ammonium sulfato or phosphato, or monoethanolamine-, diethanolamine-, triethanolamine-, methylamine-, ethylamine- or butylamine-sulfato or phosphato;

and a glycerin derivative selected from the group consisting of

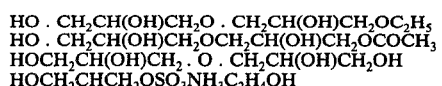
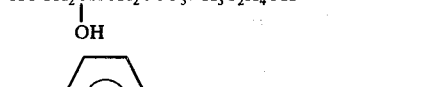
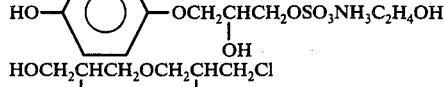
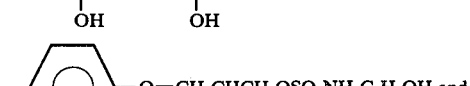
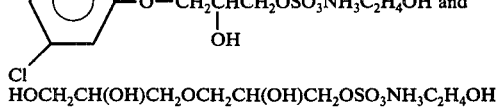

and subjecting the resulting fiber material to a dry and/or wet heat treatment.

4. A liquid dye composition comprising a water-insoluble dye and at least one member selected from the group consisting of a polyoxyethylene of the formula I:

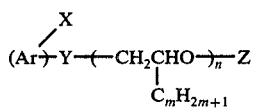

wherein Ar is naphthalene nucleus substituted by aryl-$C_1$-$C_3$ alkyl, or a benzene nucleus substituted by at least one aryl, aryloxy, aryl-$C_1$-$C_3$ alkyl or $C_5$-$C_6$ cycloalkyl, said aryl being hydrocarbyl unsubstituted or substituted by methyl or phenyl-$C_1$-$C_3$ alkyl;

Y is —O—, —COO— or —CH$_2$O—;

$m$ is a numeral 0 or 1;

$n$ is an integer of 1 to 30;

Z is alkali metal sulfato or phosphato, ammonium sulfato or phosphato, or monoethanolamine-, diethanolamine-, triethanolamine-, methylamine-, ethylamine- or butylamine-sulfato or phosphato salts;

and X is hydrogen or

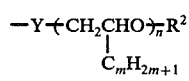

Y, $m$ and n are as defined above, and $R^2$ is alkali metal sulfato or phosphato, ammonium sulfato or phosphato, or monoethanolamine-, diethanolamine-, triethanolamine-, methylamine-, ethylamine- or butylamine-sulfato or phosphato;

and a glycerin derivative selected from the group consisting of

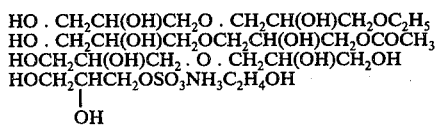

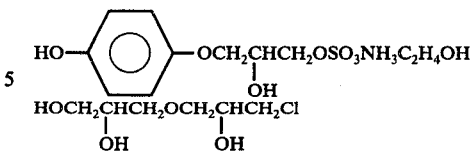

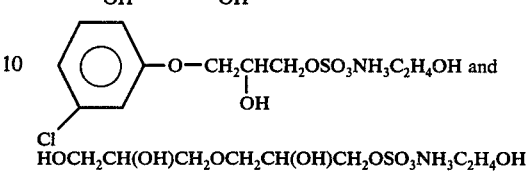

5. The method according to claim 1, wherein the polyoxyethylene is

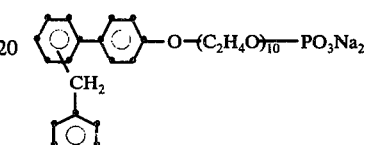

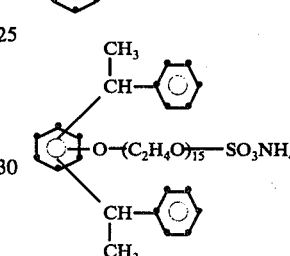

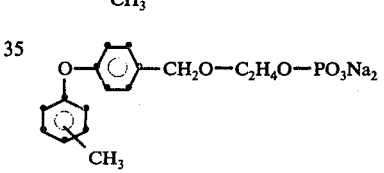

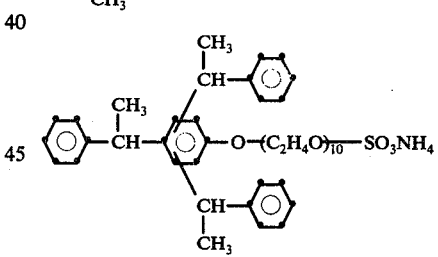

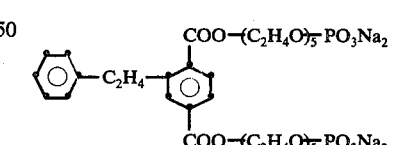

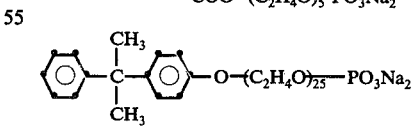

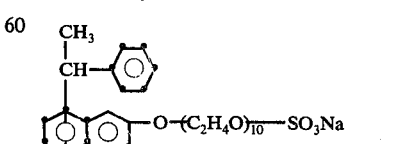

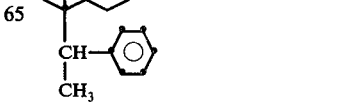

-continued

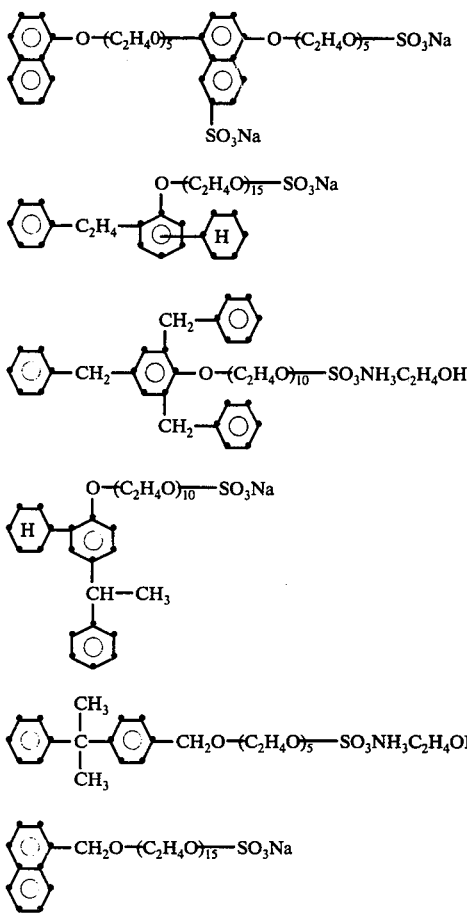

6. The method according to claim 2, wherein the padding bath or printing paste further comprises thickeners, auxiliaries, carriers and organic acids or ammonium salts thereof.

7. The method according to claim 2, wherein the amount of the glycerin is 0.1 to 10 parts by weight based on 100 parts by weight of the padding bath or printing paste.

8. The method according to claim 3, wherein the printing paste further comprises water-soluble thickeners, defoaming agents, metal sequestering agents, oxidizing agents and/or textile finishing agents.

9. The method according to claim 3, wherein the amount of the polyoxyethylene (I) is 0.01 to 10 parts by weight based on 100 parts by weight of the printing paste, and the amount of the glycerin derivative is 1 to 70 parts by weight based on 100 parts by weight of the printing paste.

10. The dye composition according to claim 4, wherein each amount of the water-insoluble dye, the polyoxyethylene (I) and the glycerin is 1 to 30 parts by weight, 1 to 30 parts by weight, and 1 to 90 parts by weight, respectively, based on 100 parts by weight of the dye composition.

11. A method of preventing migration of water-insoluble dye in a continuous dyeing of polyester fiber materials, which comprises contacting the fiber materials with a padding bath comprising a water-insoluble dye and a polyoxyethylene of the formula:

wherein Ar is naphthalene nucleus substituted by aryl-$C_1$-$C_3$ alkyl, or a benzene nucleus substituted by at least one aryl, aryloxy, aryl-$C_1$-$C_3$ alkyl or $C_5$-$C_6$ cycloalkyl, said aryl being hydrocarbyl unsubstituted or substituted by methyl or phenyl-$C_1$-$C_3$ alkyl;

Y is —O—, —COO— or —$CH_2$O—;

$m$ is a numeral 0 or 1;

$n$ is an integer of 1 to 30;

Z is alkali metal sulfato or phosphato, ammonium sulfato or phosphato, or monoethanolamine-, diethanolamine-, triethanolamine-, methylamie-, ethylamine- or butylamine-sulfato or phosphato salts;

and X is hydrogen or

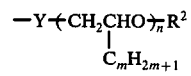

in which Y, m and n are as defined above, and $R^2$ is alkali metal sulfato or phosphato, ammonium sulfato or phosphato, or monoethanolamine-, diethanolamine-, triethanolamine-, methylamine, ethylamine- or butylamine-sulfato or phosphato, and subjecting the resulting fiber material to a dry and/or wet heat treatment.

12. The method according to claim 11, wherein the padding bath further comprises thickeners, carriers and other auxiliaries.

13. The method according to claim 11, wherein the amount of the polyoxyethylene (I) is 0.1 to 10 parts by weight based on 100 parts by weight of the padding bath.

* * * * *